Figure 1:
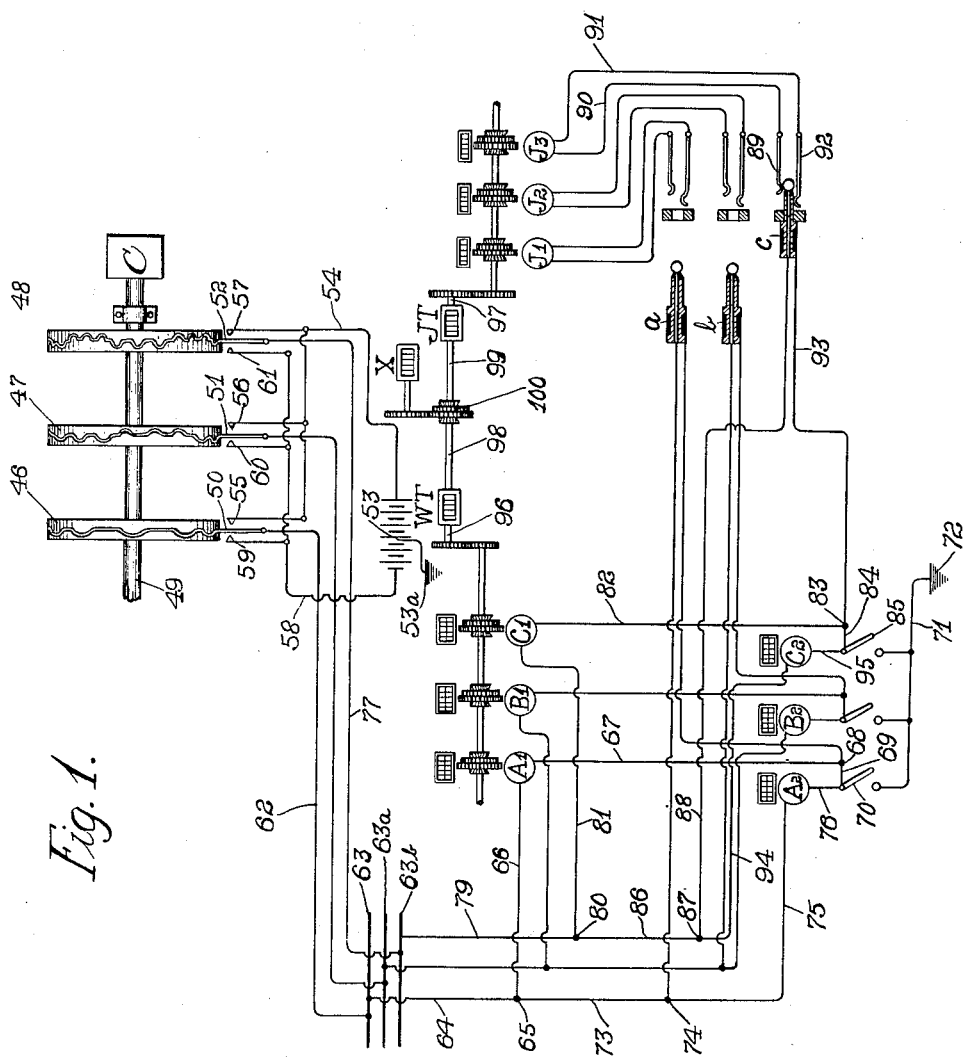

L. A. WILLIAMS.
ACCOUNTING SYSTEM.
APPLICATION FILED JAN. 26, 1909.

1,084,684.

Patented Jan. 20, 1914.
4 SHEETS—SHEET 1.

Witnesses
George C. Higham
Frank J. Thelen

Inventor
Lynn A. Williams
By Brown Williams
Attorneys

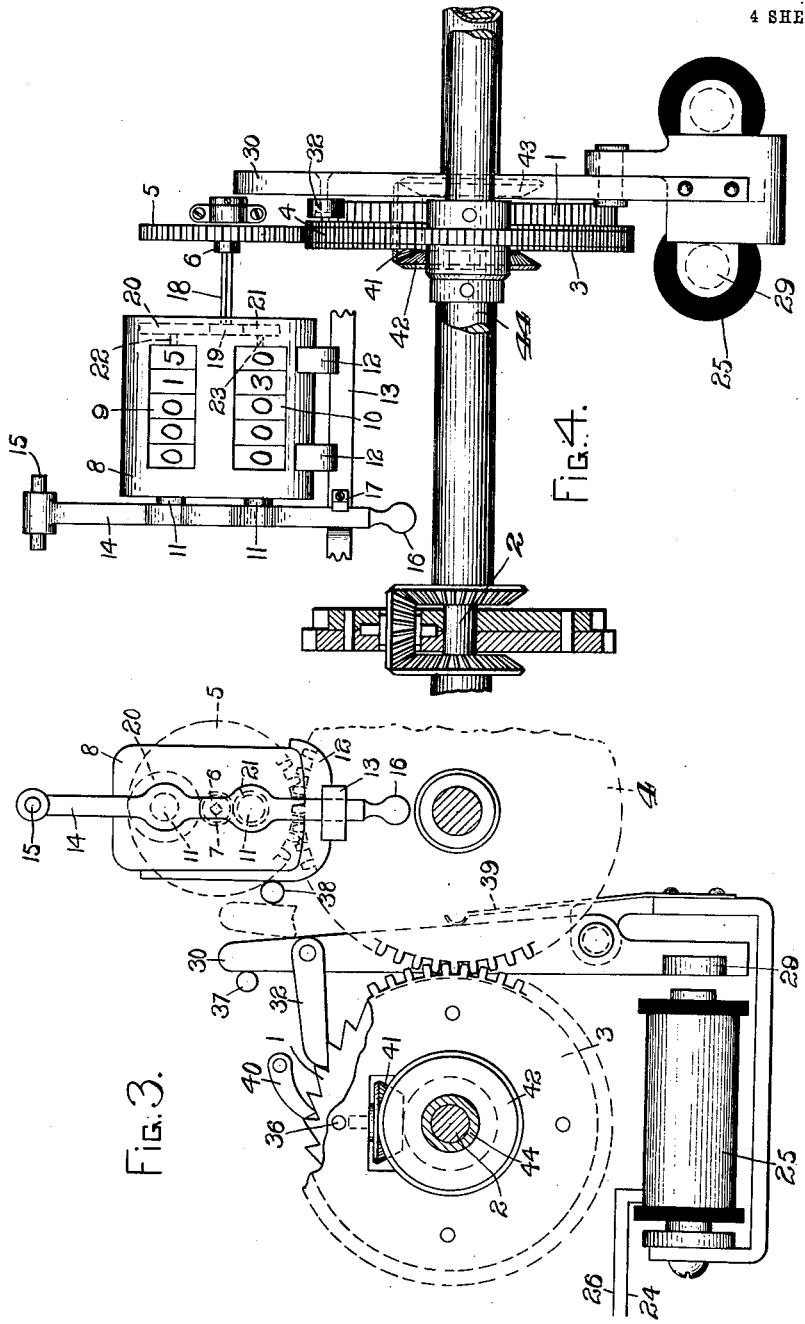

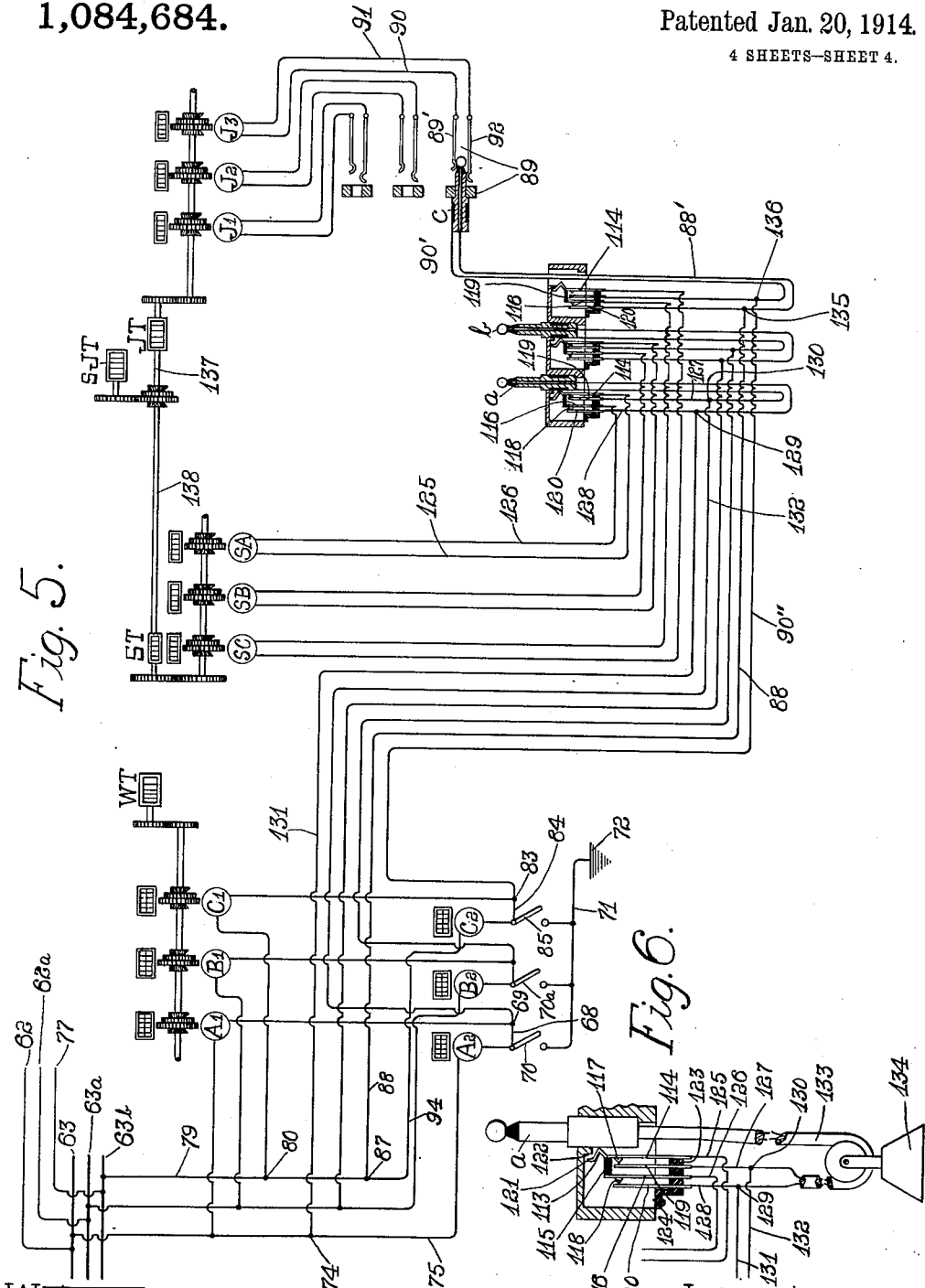

UNITED STATES PATENT OFFICE.

LYNN A. WILLIAMS, OF EVANSTON, ILLINOIS, ASSIGNOR, BY MESNE ASSIGNMENTS, TO WILLIAM R. HEATH, OF BUFFALO, NEW YORK.

ACCOUNTING SYSTEM.

1,084,684.   Specification of Letters Patent.   Patented Jan. 20, 1914.

Application filed January 26, 1909. Serial No. 474,323.

*To all whom it may concern:*

Be it known that I, LYNN A. WILLIAMS, a citizen of the United States, residing at Evanston, in the county of Cook and State of Illinois, have invented a certain new and useful Improvement in Accounting Systems, of which the following is a full, clear, concise, and exact description, reference being had to the accompanying drawings, forming a part of this specification.

My invention relates to an accounting system, with special reference to an electromechanical system for automatically accounting for an employee's time and wages. In particular this system provides for two indicators on each register, one indicator showing the workman's wages and the second his time. By this method it is possible to greatly simplify the system of electrical connections as compared with an accounting system operated by electro-mechanical devices, whereby a separate system is necessary for the time and wage registers.

My improved system also contemplates a method for accounting for the distribution of wages between various jobs. This result is effected in such manner that the registers with time and wage indicators may be set in operation and later the workman, on being assigned to a particular job, may set in operation his job register; or the registers having time and wage indicators may be so connected in circuit with the job registers that they can only be put in operation when the job register is started. Totalizing registers for wages and jobs may be employed, but this feature forms no part of the present invention.

In order to provide for different rates at which the wage registers may be actuated a system of rate disks mounted on a time-controlled shaft is used. These disks, as will hereinafter be explained, cause an electric current to be given a desired number of impulses per unit of time, and the wires over which such impulses pass are connected to a series of rate bars, such bars corresponding in number to the rate disks. The wires controlling the actuating mechanism for any desired number of registers may be connected to any one of these rate bars.

It is evident that in a combined register which indicates wages and time such a register will be useful as a time indicator only for a single rate. If a rate is changed, it is necessary either to change the gearing connecting the wage and time indicators, or a new register must be provided. This system will be explained at greater length in a later part of the specification.

My system also contemplates a series of waste wage registers to be used in connection with the job registers. Each workman is permanently assigned one or more registers having wage and time indicators suitable for indicating the amount of wages which he earns both before and after he is assigned to a definite job. In order to accomplish this, connections are made in such manner that when a workman starts his register having wage and time indicators at the same time the waste wage indicator is automatically set in operation. On being assigned to a particular job the workman withdraws his plug from its plug seat and inserts it in the proper jack for that particular job, thereby actuating the operation of the job register. In connection with the plug seat is a plug seat switch, by which means contact is broken when the plug is withdrawn from its seat, thus immediately stopping the operation of the waste wage register. It is immaterial to the purpose of this feature of my invention whether a waste wage register is assigned to each individual workman, as outlined above, or whether the actuating mechanisms for such registers are alone provided, a single register only being used to show the total amount of waste wages. The feature of necessarily operating in connection with each workman either a waste wage register or a job register in the manner described is new and may be used in connection either with registers having wage and time indicators or with registers having only wage indicators. This and other objects and advantages of my invention will become apparent as the specification proceeds.

In the accompanying drawings, where like references may be used to illustrate corresponding parts, Figure 1 is a diagrammatic representation of one practical embodiment of my system, whereby the registers having wage and time indicators may be operated without starting the job registers; Fig. 2 is a diagrammatic representation of a practical embodiment of my system, whereby the registers having time and wage indicators cannot be operated without starting the job registers; Fig. 3 is a side elevation showing registers having wage and time indicators and the gearing connecting one of these registers with a fragmentary representation of the electromagnetic actuating device; Fig. 4 represents the same as Fig. 3 only in front elevation; Fig. 5 is a diagrammatic representation of a modification of my system, whereby on operating the registers having wage and time indicators a waste wage or job-register may be selectively operated; Fig. 6 represents diagrammatically, in detail, a plug and plug switch used in the system represented in Fig. 5.

In order that the operation of this system may be clearly illustrated I will first describe the electro-magnetic actuating mechanism with the associated register having a wage and a time indicator.

In Figs. 3 and 4, 1 is a ratchet wheel loosely mounted on the shaft 2. Firmly attached to the ratchet wheel 1 is the gear 3, the teeth of which are in mesh with the idler 4, which is in mesh with the gear 5. The gear 5 is provided with a hub 6, in which is a square socket 7, the use of which will be described hereafter. A register 8 has a time indicator 9, showing units of time in tenths of an hour, and an indicator 10 showing the wages with one cent as a unit. This register 8 is provided with lugs 11, 11 and rests on supports 12, 12, which are connected to the supporting bar 13. An arm 14, which at its end is adapted to swing on the pivot 15, abuts against the lugs 11, 11 of the register 8, and near its lower end engages in a slot in the bar 13. This arm 14 is held in its engaged position by a spring 17. The register 8 is provided with a square spindle 18, which fits in the socket 7 in the hub 6. This spindle 18 is connected to the pinion 19, which in turn engages the gears 20 and 21. The gear 20, through a spindle 22, operates the time indicator 9, whereas the gear 21, through the spindle 23, operates the wage indicator 10. In the gearing connecting the wage and time indicators I do not confine myself to the particular method above described. It is evident that the gears 20 and 21 could be directly in mesh without departing from the principle which I have described. The gear 20, through the spindle 22, is adapted to be disengaged from the pinion 19 by either pushing in or pulling out to the left or right as the case may be, as indicated in Fig. 4. The same is true of the gear 21 with its spindle 23. The object of this feature is to enable either the time or wage indicator to be disconnected without affecting the readings of the other indicator. It is evident that in order to disengage the register 8 from the actuating mechanism it is only necessary to swing out the arm 14 by its handle 16 and to then slip the register 8 to the left, as shown in Fig. 4, thereby withdrawing the spindle 18 from the socket 7. A new register can then be placed in position, being securely held on one side by the hub 6 and on the other by the arm 14.

The electromagnetic actuating mechanism associated with each register comprises a suitably supported electromagnet 25 and the armature lever 30, which carries at one end the armature 29 and at its other end the pivoted pawl 32. The lever is pivotally mounted intermediate between its ends, and is normally held in the position in which it is shown in full lines in Fig. 3 by means of the spring 39. The electromagnet is adapted to be connected to a source of electric impulses through the conductors 24 and 26, and whenever it is energized it attracts its armature 29, which causes the lever 30 to move into the position which is partly indicated in dotted lines at 31 in Fig. 3. This movement of the lever causes the pawl 32 to drop into the next lower tooth of the ratchet wheel 1. The energization of the electromagnet is more or less only momentary, and upon deënergization the spring 39 forces the lever 30 to the left, thereby causing the pawl 32 to move the ratchet wheel the distance of one tooth. The stop 37 limits the movement of the armature lever in this direction. In order to prevent accidental backward movement of the ratchet wheel 1 there is provided the locking pawl 40. In this way the register is actuated by a step-by-step movement, the rate of actuation depending upon the frequency of energization of the electromagnet.

The beveled pinion 41 is pivoted in the body of the wheel formed by the ratchet 1 and the gear 3. This pinion engages with the beveled gears 42 and 43, as shown in Fig. 4. The beveled gear 42 is secured to one end of the sleeve 44, while the beveled gear 43 is secured to the adjacent end of the sleeve 45, these sleeves being rotatably mounted on the shaft 2. It will be clear from this construction of the differential gearing that a series of such differential sets may be placed upon the shaft 2, whereby the actuations of the ratchet wheels of the actuating mechanisms will be totalized. It is thus seen that we have a compound shaft comprising a plurality of axially alined sections which are operatively connected by means of differential gearing, and that rotary motion may be imparted to this compound shaft at any of the points where such a differential system is interposed. This serial shaft, at one end, is connected to a totalizer and it will appear that any rotary motion applied to any section of the shaft will be transmitted directly to the end section which is associated with the totalizer. Thus, the section which is most remote from the totalizer will travel at the lowest rate of speed, if motion is being imparted to more than one section at a time, while those sections nearer the totalizer will operate at correspondingly higher rates of speed. In other words if one actuating set is imparting motion to a certain section of the shaft, the starting of another actuating set results in the motion of the shaft section nearest the totalizer at a greater speed. If all the actuating sets are in operation, the shaft section directly associated with the totalizer will operate at a speed dependent upon the individual speeds of all the other sections.

Turning now to a consideration of the system as a whole, in Fig. 1, the rate disks 46, 47 and 48 are mounted rigidly on the shaft 49, which is driven by any suitable time actuated mechanism C. Each of these rate disks is provided with a groove on its periphery, this groove having a series of undulations corresponding to the number of electric impulses which it is desired to convey through the system. In these grooves the spring contacts 50, 51, 52 are adapted to move. Associated with these disks is a battery 53, grounded at 53a, one terminal of which, through the wire 54, connects with the contacts 55, 56 and 57, and through the other terminal, by way of the wire 58, connects with the contacts 59, 60 and 61. It is evident that by the movement of the spring contacts 50, 51 and 52 electrical connection may be made with either one terminal or the other of the battery. In the case of the rate represented by disk 46, when a contact is made with 50 the current passes through the wire 62 to the rate bar 63. This rate bar is preferably made of copper, of large diameter and sufficiently long so that connections may be made to it from a large number of wires. Similarly when contact is made, the current passes from the contacts 51 and 52, respectively, to the rate bars 63a and 63b. We will assume that the disk 46 represents a rate of five cents per hour; 47, ten cents; and 48, fifteen cents. It is evident, therefore, that the rate bars 63, 63a and 63b, respectively, represent these same rates. From the rate bar 63 the current passes through the wire 64 to the point 65. At this point it divides, part of it going through the wire 66 to the actuating mechanism of the register A1. The current then goes through wire 67 to the point 68, through the wire 69 to the switch 70, then through the wire 71 to the ground 72. The other part of the current which is divided at the point 65 passes through the wire 73 to the point 74, at which point it divides, if a job register is connected, as will be hereafter described. Or, if a job register is not employed, the whole of the current goes through the wire 75 to the register A2 having wage and time indicators, thence through the wire 76 to the switch 70, and through the wire 71 to the ground 72.

Tracing now the current from the spring contact 52, it passes through the wire 77 to the rate bar 63b, then through the wire 79 to the point 80. At this point the current divides, part of it going through the wire 81 to the electromagnetic mechanism actuating the register C1, then through the wire 82 to the point 83, through the wire 84 to the switch 85, and through the wire 71 to the ground 72. The second part of the current which divides at the point 80 goes through the wire 86 to the point 87, where it again divides, part of the current going through the wire 88, through the tip of the plug c, through the tip contact 89, through the wire 90 to the actuating mechanism of the job register J3, thence through the wire 91 to the sleeve contact 92, then back through the sleeve of the plug c, through wire 93 to the point 83, through the wire 84 and the switch 85 to the wire 71 and the ground 72. The second part of the current dividing at the point 87 goes through the wire 94 to the actuating mechanism of the register C2, having time and wage indicators, through the wire 95 to the switch 85, then through the wire 71 to the ground 72.

It is now evident that by closing the switch 70 workman A will put in operation the register having wage and time indicators at A1, and the second register having wage and time indicators at A2. This second register may be located in such position that it is accessible to the view of the workman, whereas the register A1 may be located in the manager's office, or at any desirable central station. If it is considered advisable that only his time and not his wages shall be open to the inspection of the workman, the wage indicator of the register A2 may be omitted, the connection to the time indicator being made by suitable gearing, or the connection may be temporarily broken, as described above, by pulling out or pushing in the spindle driving the indicator, thus throwing the gearing out of mesh with the pinion. It is also possible that either or both of the indicators of the register may be open to the inspection only of those designated by the management by having a plate secured with a padlock over the face of the indicators.

Each workman, if it is desired to operate job registers, has assigned to him a certain plug, and on being assigned to a job he inserts this plug in an appropriate jack. It is evident that at one time a workman having, for example, a five cent rate might put his plug in a certain jack, whereas at another time a second workman having a ten cent rate might put his plug in the same jack. Under these circumstances, by my system, the job register would show the correct amount for that particular job, although the rates would vary from time to time. It is obviously impossible that time indicators should be associated with the job register, inasmuch as the rate at which any given register is actuated will vary from time to time. If desired, through a system of differential gearing, the wage indications of the registers having associated wage and time indicators may be totalized and shown on a single register, as at WT, and on the other hand the amounts shown in the various job registers may be totalized into a single job register, as shown at JT. The connections through these differential gears are made in such way that the shafts 96 and 97, driving the registers WT and JT, respectively, rotate in opposite directions. Connections from these registers are made through the shafts 98 and 99, respectively, to the differential gear 100, and any differences in the amounts indicated on the registers WT and JT are shown in the register X. It is evident that by the present system amounts shown in the register WT must equal the amounts shown in the register JT. The amount in JT can never exceed the amount in WT, for the reason that the job registers can never be actuated except when the wage registers are in operation. It is evident that if the wage indicators are disconnected by the method above described, this will have no effect on the totalizing mechanism, which is entirely distinct from the gear and spindle driving any indicator.

In order to rotate the indicators of the various registers to a zero position either mechanical or electromagnetic means may be employed. These means will not be described in detail, however, as they form no part of the present invention.

Turning now to my modified system as shown in Fig. 2, the system of starting the impulses is exactly the same as that described for the system as shown in Fig. 1. Starting with the rate bar 63b, by my modified system the current passes through the wire 100 to the sleeve of the plug c, through the sleeve contact 101 of the jack 102, then through the wire 103 to the job register J3, thence through the wire 104, through the tip contact 105, through the tip of the plug c and the wire 106, to the register C1 having wage and time indicators, then through the wire 107 to the actuating mechanism of the register C2 having wage and time indicators, through the wire 108, to the switch 109, through the wire 110 to the ground 111. The circuits for the other registers may be similarly traced. It is evident that by this system switch 109 may be always closed, and that in order to start the registers having wage and time indicators and the suitable job register, all the workman has to do is to insert his plug in the proper jack. If for any reason it is desired in this system not to use the job register connection, a connection may be made from the wire 100 to the actuating mechanism of the register C1 by the wire shown in the dotted line 112, in which case the current will pass directly from the rate bar 63b, through the wires 100 and 112 to the register C1, and through the wire 107 to the register C2, thence through wire 108 to the switch 109, then through 110 to the ground 111. When this system of wiring is used, in order to start the registers having wage and time indicators it is evident that it is only necessary to close the switch 109.

Turning now to a modification of my system as shown in Fig. 5, in this case, when the registers having wage and time indicators are set in operation by the throwing of one of the switches represented at 70, 70a, or 85, simultaneously, either the waste wage indicator as SA, SB or SC is operated, or a job register as shown at J1, J2 or J3. In order to understand the operation of this system more thoroughly, Fig. 6 will first be described, which represents diagrammatically a detail view of a plug a and an associated plug seat switch. When the plug a is in its plug seat, a portion 113 of the contact 114 is forced to the left, as shown in the drawing. A contact blade 114 is connected by means of insulating material 115 to the contact blade 116. On these two contact blades are portions 117 and 118, respectively, which are adapted to make contact with the contact blades 119 and 120. When the plug a is withdrawn from its seat, the contact blades 114 and 116, which are made of spring material, move to the right and the portion 121 of the blade 114 engages the shoulder 122 of the framework and the portions 117 and 118 become separated from the switch blades 119 and 120, thus breaking the circuits. The switch blades 114, 119, 116 and 120 are rigidly supported in a base of insulating material 123, which is in turn supported by the framework at 124. To the blade contacts 114 and 116, respectively, are attached the wires 125 and 126, which lead to the actuating mechanism of one of the waste wage registers. To the contacts 119 and 120 are attached the wires 127 and 128, respectively. These wires lead to the sleeve and tip, respectively, of the plug a. To each wire at the points 129 and 130, respectively, are joined the wires 131 and 132, which will hereafter be described in connection with Fig. 5. The junctions 129 and 130 are preferably as near as possible to the lower ends of the blade contacts 120 and 119, respectively. The plug a is supplied with a cord 133, in which are contained, insulated from each other, the wires 127 and 128. According to the usual system a weight 134 is used in connection with this cord for the purpose of keeping it in slight tension at all times, and thereby preventing it from becoming tangled with other similar cords.

Turning now to a description of the system as outlined in Fig. 5, the connections for the registers A1, B1 and C1, and A2, B2 and C2 are the same as shown in Fig. 1. In the present diagram, for the sake of simplicity, the battery and means for imparting electric impulses have been omitted. The wires 62, 62a and 77 are connected with the battery, as shown in Fig. 1.

Let us suppose that workman A starts work, and in order to set his register in operation throws the switch 70, thereby completing the circuit as above described. At the point 74 the current will be divided, part of it going through the wire 75 and part through the wire 131. From 131 the current passes to the point 129, thence through the wire 128 to the switch blade 120, the plug a being in its plug seat. The portion 118 of the switch blade 116 is brought into contact with the blade 120, and a current passes through the switch blade 116 to the wire 126, thence through the actuating mechanism of the waste wage register SA, then returns through the wire 125 to the switch blade 114, then through the switch blade 119, through the wire 127 to the point 130, back through the wire 132 to the point 69, through the wire 68 and the switch 70, through the wire 71 to the ground 72. Similar circuits may be traced for workmen B and C when the plugs b and c are in their plug seat.

Let us now suppose that the plug c is withdrawn from its plug seat and inserted in the jack 89. By this operation the contact blades 114 and 116 are separated from the contact blades 119 and 120. On closing the switch 85, the current from the rate bar 63b goes through the wire 79, and after dividing at the point 80, as previously described, goes to the point 87, where it again divides, part of the current going through the wire 94 to operate the register C2 and the balance through the wire 88. From the wire 88 the current goes to the point 135, then continues its course through the wire 88' to the tip of the plug c, thence through the tip contact 89' and the wire 90 to the actuating mechanism of the job register J3, then back through the wire 91 and the sleeve contact 92, through the sleeve of the plug c and the wire 90' to the point 136. It then continues through the wire 90' to the point 83, the wire 84, the switch 85 and the wire 71 to the ground 72. In Fig. 5, for the sake of simplicity, the points 129, 130, 135 and 136, respectively, are represented as being at a considerable distance from the plug seat switches, but as described above, in actual operation these points should be close to the said plug switches.

It is evident from the above description that when any individual workman has started work and thrown his proper switch, as represented for workman A at 70, simultaneously his waste wage register or the actuating mechanism for such register is immediately put in operation, and that in withdrawing his particular plug from its plug seat, the operation of such register is immediately stopped, and on inserting the plug in any suitable jack the operation of the job register is started, the actuation being at the same rate as that of the mechanism of his register having a wage and time indicator. It is evident by this system that the presence of a time indicator on the registers which we have described as having wage and time indicators is by no means essential.

In connection with the job registers J1, J2 and J3, means may be provided for totalizing the readings of such registers and such totalization may be shown in a register JT. Similarly, the readings of the waste wage registers SA, SB and SC may be totalized in the register ST. Shafts 137 and 138 may be provided in connection with the registers JT and ST, respectively, and the sum of these two registers may be shown in the register SJT. It is evident that the readings of this register SJT must agree with that of the register WT. The exact means for totalizing the readings of these registers forms no part of the present invention, and is therefore not described in detail. If desired, the actual indicators of the registers SA, SB and SC may be omitted, having only the actuating mechanisms for such registers and means for totalizing the movements of these mechanisms, and a single waste wage reading may be shown in the waste wage register ST.

From the above description of the embodiments of my invention it is apparent that the arrangements diagrammatically shown in Figs. 1 and 2 are merely shown by way of example as illustrating the principle of my invention, and I do not confine myself to the arrangements shown therein. Considerable modifications may be made in the exact method of wiring without departing from the principle of my invention.

Having thus described my invention, what I claim as new and desire to secure by Letters Patent is:

1. In combination, a source of electric current, a plurality of registers, each register having a wage and a time indicator, electromagnetic mechanism associated with each register for actuating the same, circuit connections between said source of current and the actuating mechanisms of the registers, and switching means for controlling said circuit connections to connect any of said registers with said source of current.

2. In combination, a source of electric current, a plurality of registers, each register having a wage and a time indicator, means for actuating each register by said current, means for so connecting the wage indicator with the time indicator of each register that said indicators will be advanced by said actuating means in the same ratio as that existing between the given rate and the given time unit, and means for connecting any of said registers with said source of current.

3. In combination, a source of electric current, a plurality of registers, each register having a wage and a time indicator, means for actuating each register by said current, means for gearing the wage indicator of each register to the time indicator of the same register in the ratio of the given rate to the given time unit, and means for connecting any of said registers with said source of current.

4. In combination, a source of electric current, a plurality of registers, each register having a wage and a time indicator, means for actuating each register by said current, means for gearing the wage indicator of each register to the time indicator of the same register in the ratio of the given rate to the given time unit, said gearing adapted to be changed when the ratio between the given rate and the time unit is changed, and means for connecting any of said registers with said source of current.

5. In combination, a source of electric current, a plurality of registers, each register having a wage and a time indicator, electromagnetic mechanism associated with each register for actuating the same, a readily separable connection between each register and its associated actuating mechanism for permitting the bodily removal of the register, circuit connections between said source of current and the actuating mechanisms of the registers, and switching means for controlling said circuit connections to connect any of said registers with said source of current.

6. In combination, a plurality of independent registers, each register having a wage and a time indicator, means for actuating each register by said current, means for so supporting each register that the same may be readily withdrawn bodily out of engagement with said actuating means and as readily moved into engagement therewith, and means for connecting any of said registers with said source of current.

7. In combination, a source of electric current, a plurality of registers, each register having a wage and a time indicator, means for actuating each register by said current, means for gearing the wage indicator of each register to the time indicator of the same register in the ratio of the given rate to the given time unit, means for replacing any register with a register having the wage and time indicators geared in a suitably different ratio when the rate of wages is changed, and means for connecting any of said registers with said source of current.

8. In combination, a source of electric current, a plurality of registers, each register having a wage and a time indicator, means for actuating each register by said current, means for rendering inactive one indicator of any register without affecting the actuation of the other indicator, and means for connecting any of said registers with said source of current.

9. In an accounting system, the combination of a plurality of independent registers, each register having a time and a wage indicator, electrically controlled actuating means associated with each register, and means for so supporting each register that it may be readily removed bodily from its actuating means.

10. In an accounting system, a plurality of registers, each register having a time and a wage indicator geared together in the ratio of the given rate to the given time unit, means for replacing said register by another register having the time and wage indicators geared together in a different ratio, and means for actuating each register at a speed proportionate to the given rates of wages.

11. In an accounting system, a plurality of registers, each register having a time and wage indicator geared together in the ratio of the given rate to the given time unit, means for replacing said register by another register having the time and wage indicators geared together in a different ratio, and means for electrically actuating each register at a speed proportionate to the given rates of wages.

12. In an accounting system, a register having a time and a wage indicator, means for gearing said indicators together in the ratio of the given rate of wages to the unit of time, means for changing the ratio of such gearing as the rate of wages is changed, and electrically controlled means for actuating said register at a speed proportionate to the rate of wages.

13. In an accounting system, a corresponding plurality of wage registers, a plurality of waste-wage registers, a plurality of job registers, actuating means for each register, a source of power, means for connecting any of said wage registers to said source of power, and means for automatically and simultaneously connecting the corresponding waste-wage register to said source of power, each waste-wage register being adapted to be automatically disconnected from said source of power when a job register is so connected.

14. In an accounting system, a plurality of wage registers, a plurality of waste-wage registers, a plurality of job registers, a wage register and a waste-wage register being assigned to an individual workman, actuating means associated with each register, a source of power, means for connecting any of said wage registers to said source of power, means for automatically and simultaneously connecting a waste-wage register to said source of power, and means for automatically disconnecting said waste-wage register from said source of power when a job register for said workman is connected to said source of power.

15. In an accounting system, a source of electric current, a plurality of wage registers, a plurality of waste-wage registers, a plurality of job registers, a wage register and a waste-wage register being assigned to each workman, electrically controlled actuating means for each of said registers, means for connecting any of said wage registers to said source of current, means for automatically, simultaneously and selectively connecting either the waste-wage register of said workman or a job register to said source of current.

16. In an accounting system, a source of electric current, a plurality of wage registers, a plurality of waste-wage registers, a plurality of job registers, a wage register and a waste-wage register being assigned to each workman, electrically controlled actuating means for each of said registers, means for connecting any of said wage registers to said source of current, a plug for automatically connecting the waste-wage register of said workman to said source of current when said plug is in its plug seat, and means for disconnecting said waste-wage register from said source of current when said plug is used to connect a job register to said source of current.

17. In an accounting system, a source of electric current, a plurality of wage registers, a plurality of waste-wage registers, a plurality of job registers, a wage register and a waste-wage register being assigned to each workman, electrically controlled actuating means for each of said registers, means for connecting any of said wage registers to said source of current, a plug adapted to connect any job register to said source of current, and a plug seat switch adapted to connect said waste wage register to said source of current when said plug is in its plug seat.

18. In combination, a source of electric current, a plurality of wage, waste-wage and job registers, electrically controlled actuating means associated with each register, means for connecting any of said wage registers to said source of current, a plurality of plugs, each plug associated with a wage register, a plurality of plug seat switches, each plug seat switch associated with the same wage register as said plug, adapted to operate said plug seat switch, a plurality of jacks, each jack associated with a job register, means for connecting any job register in the same electrical circuit with any wage register when the plug associated with said wage register is inserted in the jack associated with said job register, and means for connecting a waste-wage register in said circuit by means of said plug seat switch when said plug is in its seat.

19. In a device of the class described, the combination of a wage register, a waste wage register, an actuating means adapted to control the actuations of the wage register or the waste wage register at a predetermined rate, means for controlling the connection of the wage register with the actuating means, and means for automatically connecting the waste wage register with the actuating means when the wage register is disconnected from the actuating means.

20. In a device of the class described, the combination of a wage register, a waste wage register, an actuating means adapted to control the actuations of the wage register or the waste wage register at a predetermined rate, means for controlling the connection of the wage cost register with the actuating means, and means for automatically connecting the waste wage register with the actuating means when the wage cost register is disconnected from the actuating means and for disconnecting the waste wage register from the actuating means when the wage cost register is connected with the actuating means.

21. In a device of the class described, the combination of a wage cost register, means for actuating the wage cost register, means for controlling the connection of the wage cost register with the actuating means, a waste wage register normally connected with the actuating means, and means for automatically disconnecting the waste wage register from the actuating means when the wage cost register is connected with said actuating means.

22. In combination, a source of power, a plurality of registers adapted to be actuated by said source of power, each register having a wage and a time indicator connected together in a predetermined gear-ratio, and means for connecting any of said registers with said source of power.

23. In combination, a wage-register, a time-register, a single electric circuit for actuating said registers, means for producing current impulses of different rates, and means for sending current impulses of a desired rate through said circuit proportional to a predetermined rate of wages.

24. In combination, a wage-register, an electric circuit therefor, means for sending current impulses of a predetermined frequency to said circuit to actuate the wage-register at a predetermined rate of wages, and a time-register mechanically connected with said wage-register.

25. In combination, a plurality of wage-registers, a source of electric impulses of predetermined frequency, a set of circuits for said wage-registers to connect the same with said source, means for connecting any of said wage-registers with said source for actuation at predetermined rates, and a time-register mechanically connected with each wage-register.

26. In combination, a plurality of wage-registers, a plurality of time-registers, a source of electric impulses of predetermined frequency, and a set of wage-circuits for operating the registers of both classes.

In witness whereof, I hereunto subscribe my name this 23rd day of January A. D. 1909.

LYNN A. WILLIAMS.

Witnesses:
FRANK J. THELEN,
ALBERT G. MCCALEB.